NON-POLARIZED CLAMPING SELENIUM RECTIFIER

Filed Jan. 20, 1967

INVENTORS
JEFFERSON D. DANNER
LYLE W. QUATROCHI
BY
OSTROLENK, FABER, GERB & SOFFEN
ATTORNEYS 3,445,738

NON-POLARIZED CLAMPING SELENIUM RECTIFIER

Jefferson D. Danner, Manhattan Beach, and Lyle W. Quatrochi, Palos Verdes, Calif., assignors to International Rectifier Corporation, El Segundo, Calif., a corporation of California Filed Jan. 20, 1967, Ser. No. 610,527
Int. Cl. H01l 3/02, 7/16
U.S. Cl. 317—241 5 Claims

ABSTRACT OF THE DISCLOSURE

A selenium rectifier plate has selenium layers, barrier layers, and counter electrodes applied to both surfaces of a central base plate so that two selenium rectifiers are formed on a common base plate with opposing forward current conducting directions. The barrier layer on each side of the common plate is treated by etching to form sharp controlled reverse breakdown characteristics for each of the rectifiers so that the assembly acts as a non-polarized voltage clamping device.

This invention relates to selenium rectifier plates, and more specifically relates to a selenium rectifier plate which is composed of a common base plate upon which the layers defining the normal selenium rectifier are deposited on both sides thereof and where the barrier layers may be treated to form sharp controlled breakdown characteristics for the devices formed.

Clamping rectifiers are well known to the art for the protection of electrical components from various types of transient disturbances. By way of example, semiconductor devices such as silicon rectifiers, controlled rectifiers, transistors, and the like, can be degraded or destroyed by voltage spikes in their circuits of sufficient energy due to various transient causes. In order to protect such devices from the changes within these voltage spikes, selenium rectifier plates which have been suitably processed to exhibit a sharp reverse voltage breakdown are connected in parallel with the devices. The reverse voltage breakdown characteristic of the selenium plate is such that breakdown will occur at instantaneous voltages somewhat lower than the voltage that would damage the device being protected. When it is necessary to provide a non-polarized clamping protection for a device, two selenium plates which are reversely poled are necessary since the disturbance to be protected against may occur in either of the polarities. Therefore, the cost of the protective device is doubled and increased space is required for such protective devices.

In accordance with the present invention, two selenium rectifiers are formed on the opposite surfaces of a common base plate thereby to define two rectifier elements connected with opposing polarities whereby the single plate can serve as a non-polarized clamping device.

Accordingly, a primary object of this invention is to form a unitary clamping rectifier which is non-polarized.

Yet another object of this invention is to provide a non-polarized clamping device which is inexpensive as compared to two separate polarized elements.

A further object of this invention is to provide a novel non-polarized clamping device which takes less space than two separate polarized clamping elements.

These and other objects of this invention will become apparent from the following description when taken in connection with the drawings, in which.

Figure 1:
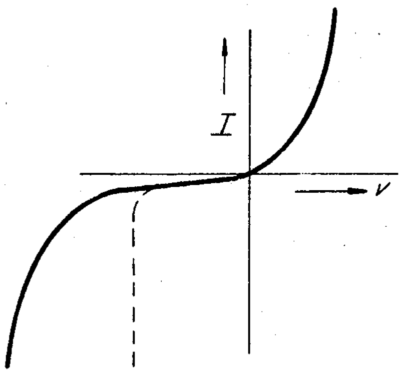
FIGURE 1 illustrates the characteristic voltage-current curve of a typical selenium rectifier plate and further illustrates in dotted lines the relatively sharp reverse breakdown characteristic when the plate is suitably treated.

Referring first to FIGURE 1, there is illustrated the standard voltage-current curve of a selenium rectifier element. Note that the voltage magnitudes and current magnitudes in the first and third quadrant of the curve have been compressed for purposes of clarity whereby the voltages of the first quadrant are shown in a magnified scale while the currents in the third quadrant are shown in a magnified scale.

Figure 2:
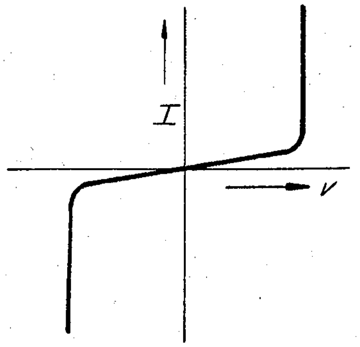
FIGURE 2 illustrates the current-voltage characteristic of two oppositely poled selenium rectifier plates which have been appropriately treated for sharp reverse breakdown characteristic for use as non-polarized clamping devices.

Normally, a typical plate would begin to break down in the third quadrant as illustrated in dotted lines on a rather vaguely shaped "knee." It is known to the art and will be briefly described later that if the barrier layer of the selenium rectifier is appropriately treated as by etching, that the reverse breakdown characteristic of FIGURE 1 will assume the dotted line shape of FIGURE 1 with a rather sharply defined knee. A device processed in this manner can now serve as the voltage clamping structure for protection of another circuit element whereby, when the voltages across the circuit element being protected exceed the reverse voltage breakdown characteristics of the clamping rectifier, the clamping rectifier will begin to conduct in order to hold the voltage across the element being protected to below its breakdown voltage.

Where a single clamping element is used, the clamping protection is polarized; that is, the protection proceeds only for voltages in the reverse direction of the clamping rectifier once the rectifier is conductive with a relatively low voltage drop in its forward direction as illustrated in its first quadrant of FIGURE 1. Therefore, if non-polarized protection is required, two polarized devices must be connected in series with one another and in parallel with the device being protected to define a current-voltage characteristic as shown in FIGURE 2, where one device will break down in the reverse direction in the first quadrant of FIGURE 2 with voltages of a first polarity, while the second device will break down in the third quadrant of FIGURE 2 under voltages of an opposite polarity.

Figure 4:
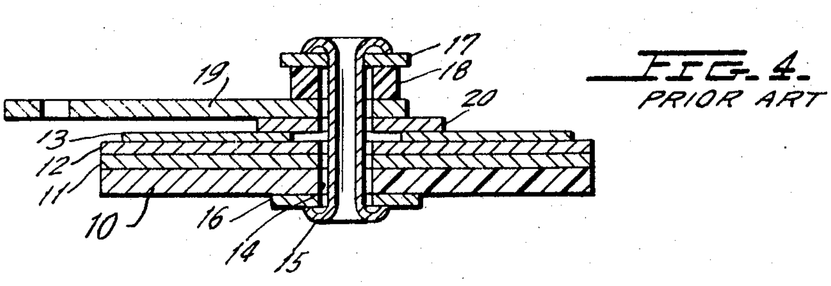
FIG. 4. PRIOR ART
FIGURE 4 is a cross-sectional view of FIGURE 3 taken across the section line 4—4 in FIGURE 3.
Figure 3:
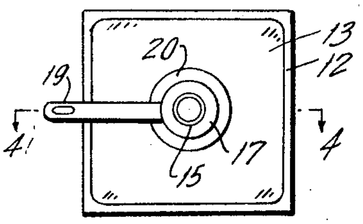
FIGURE 3 is a front view of a typical rectifier plate of the prior art.

The manner in which the prior art polarized devices have been constructed is illustrated in FIGURES 3 and 4 wherein a conductive base plate 10 is provided which has a suitable selenium layer 11 deposited thereon and suitably treated in the manner well known to the art. Note that the layer thicknesses have been greatly exaggerated in FIGURE 3 for purposes of clarity where the base plate 10 may be of any desired thickness such as $\frac{1}{32}$ of an inch, while selenium layer 11 may be from 0.002 to 0.006 inch in thickness. A barrier layer 12, which may be a cadmium sulfide-cadmium selenide material is next deposited atop selenium layer 11 in the usual manner. Where the device is to be a normal rectifier exhibiting the solid line characteristic of FIGURE 2, a counter electrode 13 is next applied atop barrier layer 12 and is a suitable metallic alloy layer such as bismuth cadmium alloy which is sprayed atop barrier layer 12 to a suitable thickness. In order to mount the device, an opening 14 is formed through the plate and passes, for example, a metallic eyelet 15 which is connected to base plate 10 at the bottom thereof by a metallic washer 16. The top of eyelet 15 bears on washer 17 which, in turn, bears on insulation spacer 18 which forces a terminal tab 19 into engagement with a spring washer 20 which engages the upper surface of counter electrode 13. Thus, the eyelet 15 can serve as one terminal of the rectifier while the terminal tab 19 serves as the other terminal of the device.

The foregoing construction, as pointed out previously, is well known to the art. Where the device is to have the dotted line characteristic of FIGURE 1, immediately after the barrier layer 12 is formed, the surface of the barrier layer is etched as by exposing the surface to hydrochloric acid fumes. The counter electrode 13 is then applied, and the device is electroformed in the standard manner. Due to the barrier layer etch step, the device will exhibit the relatively sharp controlled reverse breakover voltage of FIGURE 1. Where non-polarized clamping is necessary, two devices of the type shown in FIGURES 3 and 4 must be connected in opposing polarity.

Figure 5:
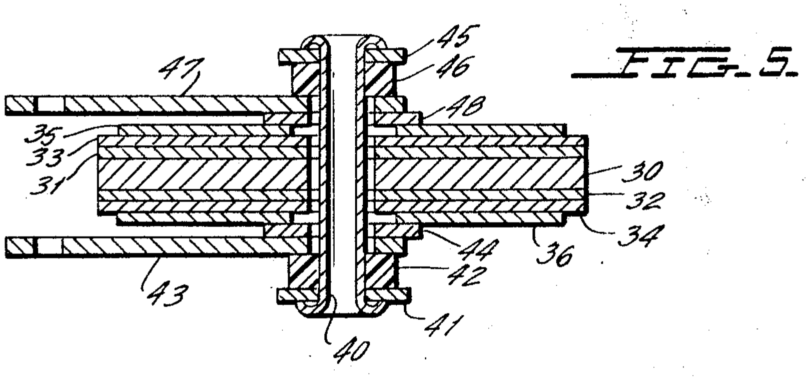
FIGURE 5 is a cross-sectional view of the novel non-polarized rectifier plate constructed in accordance with the present invention.

In accordance with the present invention, two complete cells are formed on a common base plate so that the device serves as two complete rectifier elements connected in oppositely poled arrangement. The novel plate of the invention is illustrated in FIGURE 5 and is comprised of a central common aluminum base plate 30. The base plate 30 is then treated by the formation of selenium layers 31 and 32, barrier layers 33 and 34, and counter electrode layers 35 and 36 which are respectively on opposite sides of plate 30. The process for depositing these layers on plate 30 is identical to that used for the formation of a single plate except that each step is sequentially performed on each side of plate 30. Thus, the selenium layer 31 is first deposited on plate 30 in the usual manner and the plate 30 (or sheet from which it is subsequently cut) is thereafter turned upside-down and the layer 32 is thereafter deposited on the bottom surface of plate 30. These two selenium layers 31 and 32 are then annealed in the same annealing cycle in the manner normal for the formation of a single selenium layer. A cadmium sulfide-cadmium selenide barrier layer is subsequently evaporated onto both surfaces of selenium layers 31 and 32 again in the usual prior art manner for a single surface.

In order to form the sharp reverse voltage breakdown characteristics desired as illustrated in FIGURE 2, both of surfaces 33 and 34 are exposed to hydrochloric fumes in order to sutiably etch the surfaces. Thereafter a bismuth cadmium counter electrode or other suitable alloy is sprayed onto both surfaces.

In order to mount the device, an eyelet 40 is passed through a suitable centrally located opening in the plate with the bottom of the eyelet forcing washer 41, insulation spacer 42, terminal tab 43 and washer 44 against counter electrode 36, whereupon terminal tab 43 is electrically connected to counter electrode 36.

In a similar manner, the top of eyelet 40 compresses washer 45, insulation spacer 46, terminal tab 47, and conductive washer 48 against counter electrode 35 thereby to electrically connect terminal tab 47 to counter electrode 35. The upper sections of the device including layers 30, 31, 33 and 35 will now define a first clamping rectifier element having a first polarity, while layers 30, 32, 34 and 36 define a second rectifier element having an opposing polarity.

Figure 6:
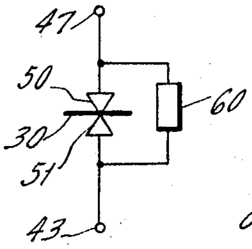
FIGURE 6 illustrates a circuit connection for the invention.

A device which requires protection by a non-polarized clamping device will be connected across the terminal tabs 43 and 47 which define the two terminals of the clamping device where it will be protected in accordance with the clamping voltages, as illustrated in FIGURE 2. This circuit diagram is schematically illustrated in FIGURE 6 wherein the terminal tab 47 is connected in series with a rectifier 50 having a polarity and terminating on the common plate 30 and extending through a second rectifier 51 to a second terminal defined by terminal tab 43. The device 60, which is to be protected, is then connected across terminals 43 and 47.

It is to be noted that the device could also serve the function of a single phase, full wave bridge connected rectifier circuit wherein terminals 43 and 47 are connected across the secondary of a rectifier transformer while the plate 30 is connectable in series with a load and a center tap on the transformer secondary winding.

Although this invention has been described with respect to preferred embodiments thereof, it should be understood that many variations and modifications will now be obvious to those skilled in the art, and it is preferred, therefore, that the scope of this invention be limited not by the specific disclosure herein but only by the appended claims.

The embodiments of the invention in which an exclusive privilege or property is claimed are defined as follows:

1. A unitary device defining first and second reversely poled selenium rectifiers comprising a metallic base plate; first and second selenium layers over substantially the full top and bottom surfaces of said metallic base plate; first and second etched barrier layers of cadmium sulfiide-cadmium selenide over substantially the full upper and lower surfaces, respectively, of said first and second selenium layers, respectively; and first and second counter electrodes over substantially the full upper and lower surfaces, respectively, of said first and second barrier layers, respectively.

2. The unitary device of claim 1 wherein; said first and second selenium layers are identically constituted; said first and second barrier layers are identically constituted; and said first and second counter electrodes are identically constituted.

3. The untary device of claim 1 comprising clamping means for maintaining respective terminals in electrical contact with said counter electrodes.

4. The unitary device of claim 1 wherein said device comprises a hole extending therethrough and clamping means disposed therein for maintaining an individual terminal respectively in contact with each counter electrode.

5. The method of manufacture of a unitary first and second reversely poled selenium rectifier; comprising the steps of depositing a first selenium layer on one surface of a selenium plate, depositing a second selenium layer on the opposite surface of said selenium plate, alloying said first and second selenium layers, depositing a first cadmium-sulfide-cadmium selenide barrier layer atop said first selenium layer, depositing a second cadmium sulfiide-cadmium selenide barrier layer atop said second selenium lawer, subjecting said first and second barrier layers to HCl fumes to etch said first and second barrier layers, and thereafter applying first and second counter electrodes atop said first and second barrier layers, respectively.

References Cited

UNITED STATES PATENTS

| | | | |
|---|---|---|---|
| 2,205,897 | 6/1940 | Brunke | 317—234 |
| 2,414,471 | 1/1947 | Kottermann | 317—234 |
| 2,501,331 | 3/1950 | Hein | 317—234 |
| 2,524,270 | 10/1950 | Pelfrey | 317—241 |
| 2,881,371 | 4/1959 | Caldwell | 317—241 |

JAMES D. KALLAM, *Primary Examiner.*

U.S. Cl. X.R.

28—589